Figure 1:
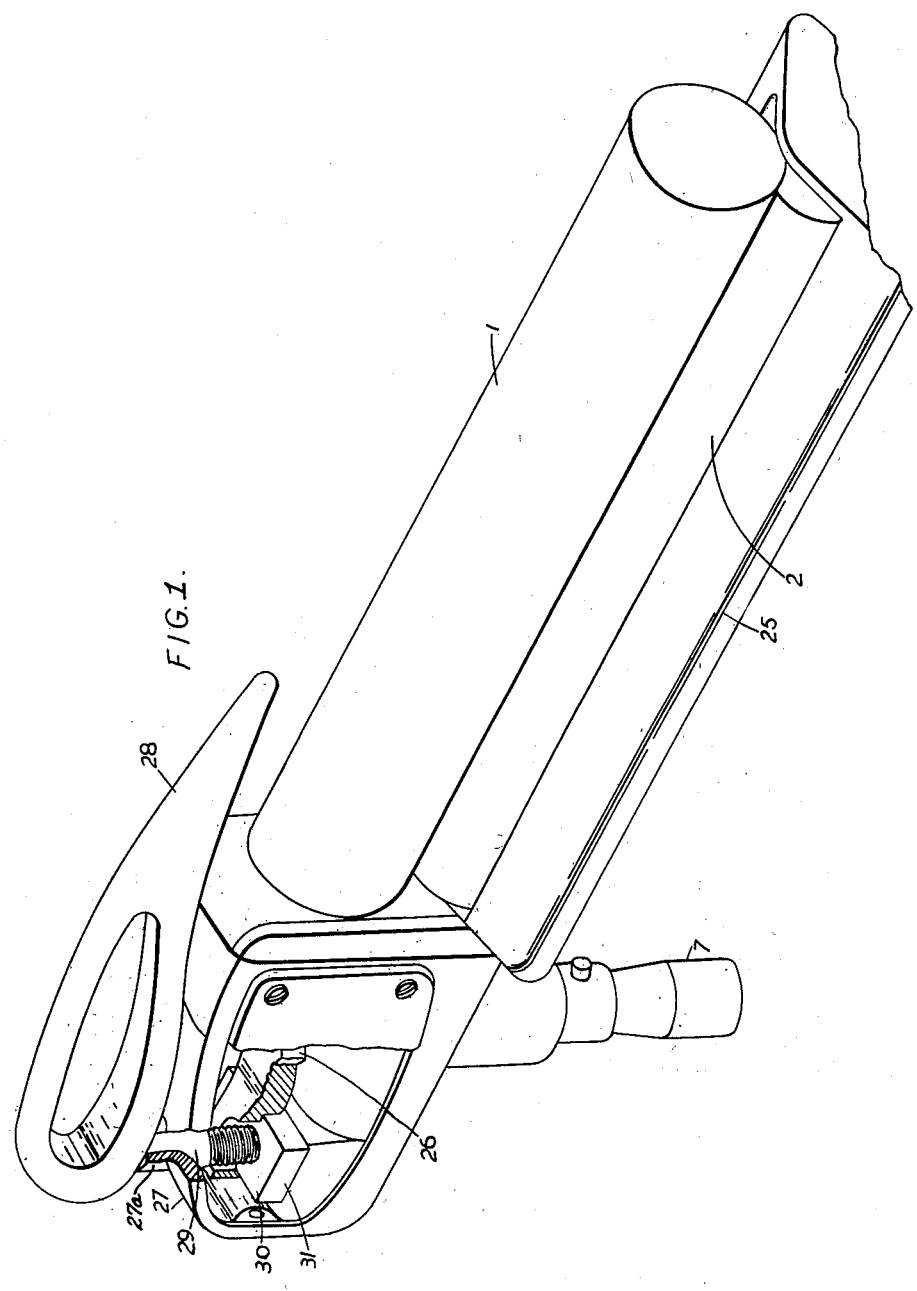

Nov. 18, 1952  S. F. BICKELL ET AL  2,618,144
WRINGING MACHINE AND THE LIKE
Filed April 19, 1948  5 Sheets-Sheet 1

Inventors
Stanley F. Bickell
John Shaw
Richard T. Riddle
Charles G. Garrard
By: Emery, Holcombe & Blair  Attorney Nov. 18, 1952 S. F. BICKELL ET AL 2,618,144
WRINGING MACHINE AND THE LIKE
Filed April 19, 1948 5 Sheets-Sheet 2

Inventors
Stanley F. Bickell
John Shaw
Richard T. Riddle
Charles G. Garrard
By: Emery, Holcombe & Blau
Attorney

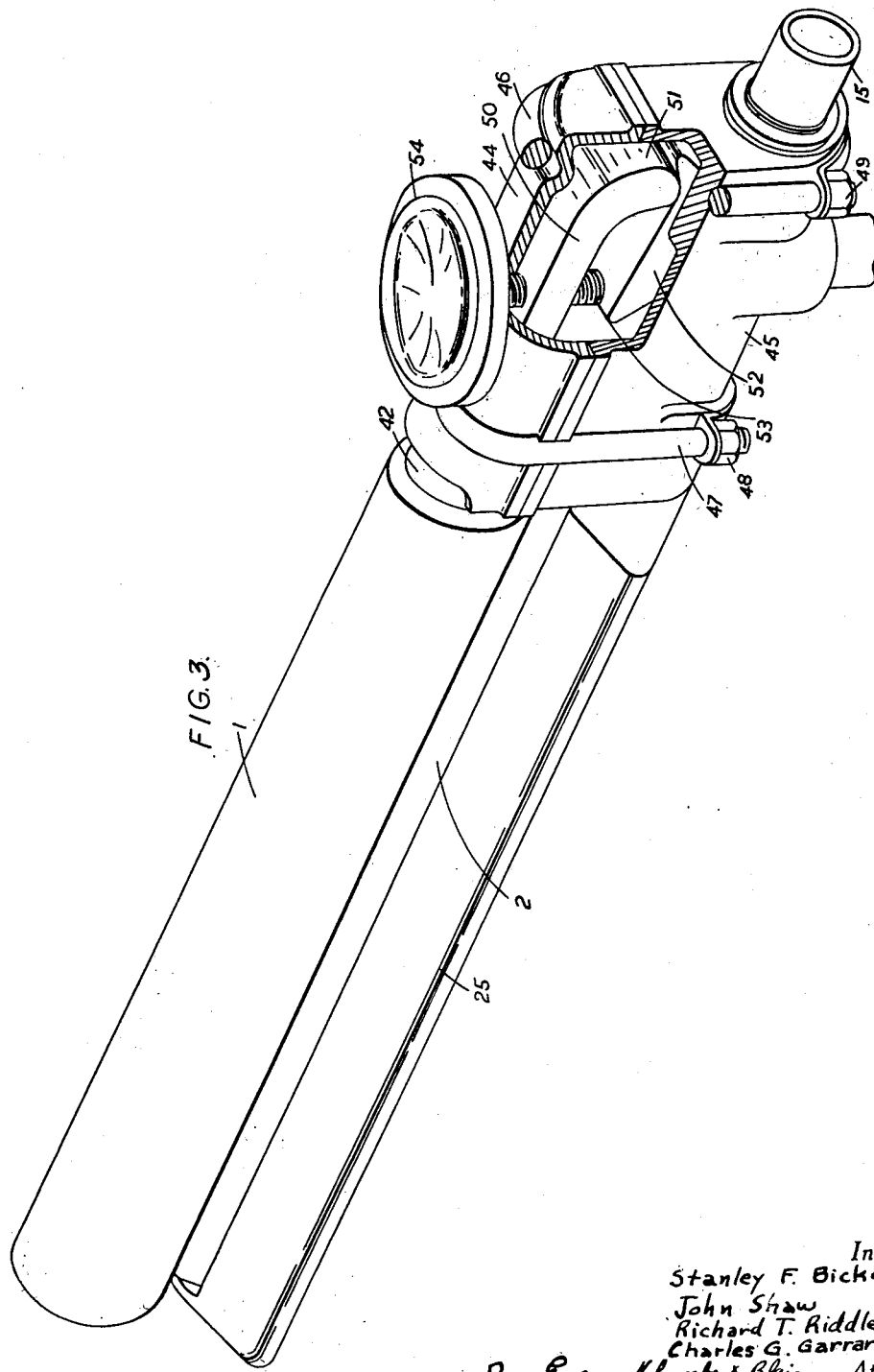

Nov. 18, 1952  S. F. BICKELL ET AL  2,618,144
WRINGING MACHINE AND THE LIKE
Filed April 19, 1948  5 Sheets-Sheet 4
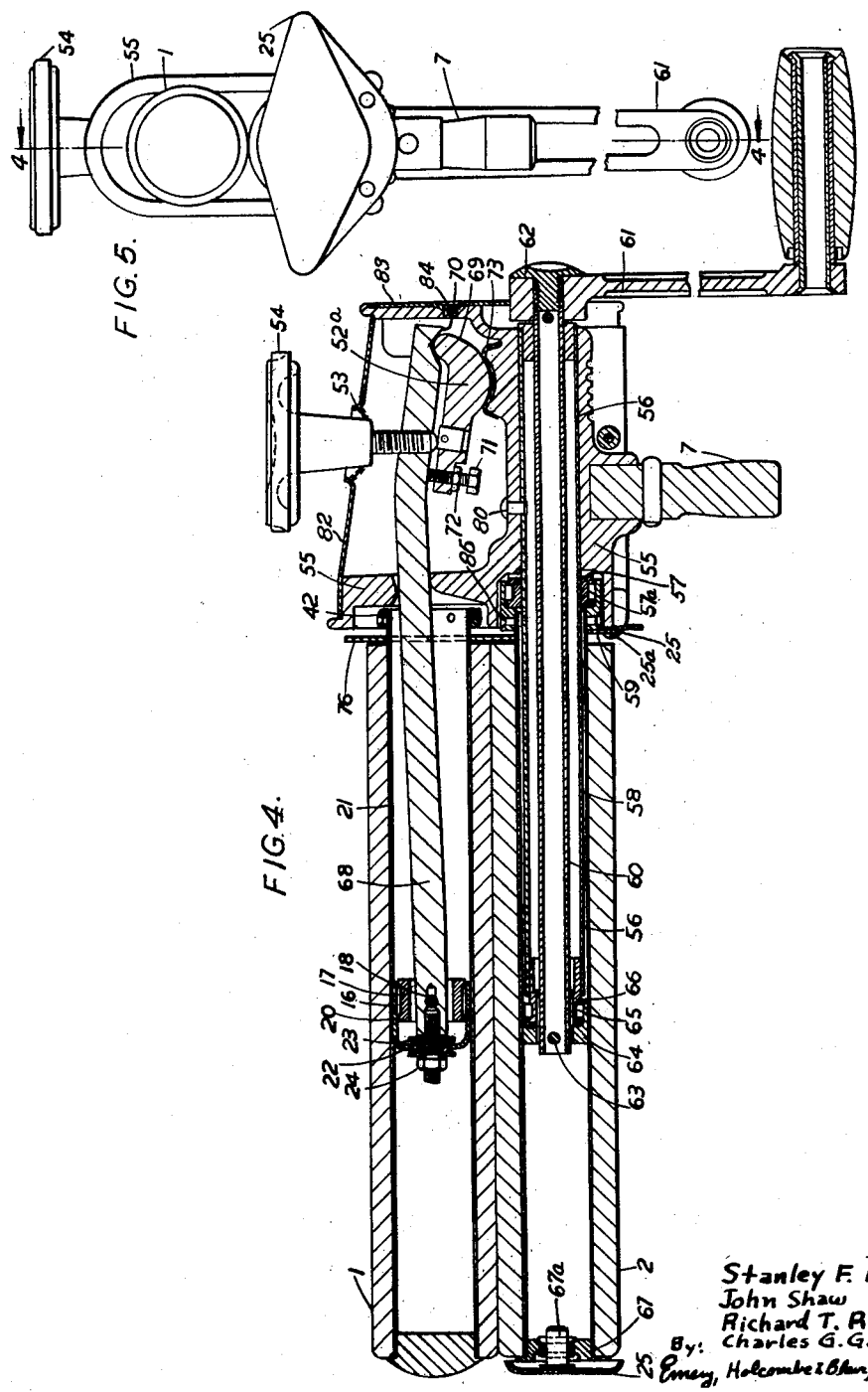
Inventors
Stanley F. Bickell
John Shaw
Richard T. Riddle,
Charles G. Garrard
By: Emery, Holcombe & Shaw Attorney Nov. 18, 1952 S. F. BICKELL ET AL 2,618,144
WRINGING MACHINE AND THE LIKE
Filed April 19, 1948 5 Sheets-Sheet 5
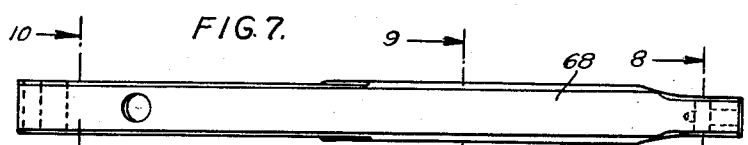
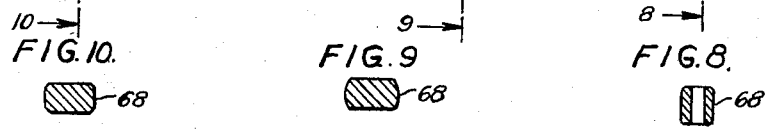
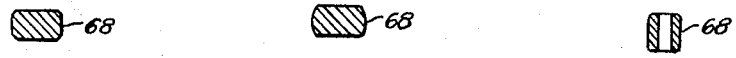
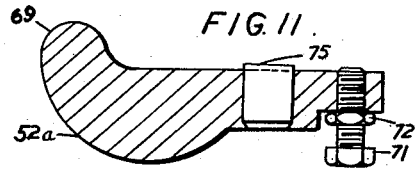
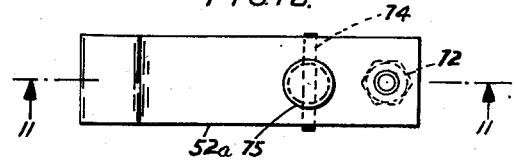
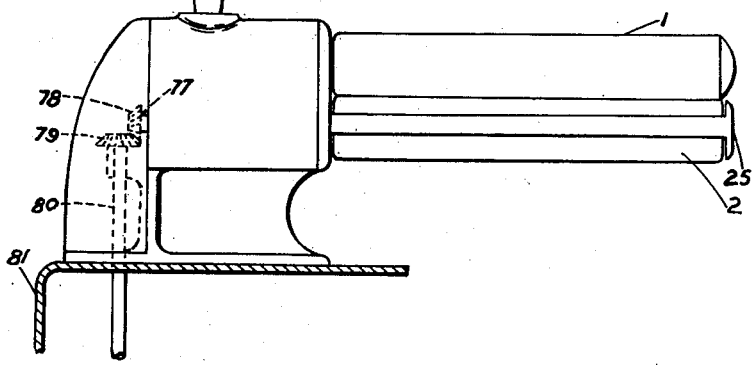
Inventors
Stanley F. Bickell
John Shaw
Richard T. Riddle
Charles G. Garrard
By: Emery, Holcombe & Blair Attorney Patented Nov. 18, 1952

2,618,144

UNITED STATES PATENT OFFICE 2,618,144

WRINGING MACHINE AND THE LIKE

Stanley Feneley Bickell, Frampton Cotterell, near Bristol, John Shaw, Yate, near Bristol, Richard Tempest Riddle, Truro, Cornwall, and Charles George Garrard, Chipping Sodbury, near Bristol, England, assignors to Parnall (Yate) Limited, Yate, near Bristol, England, a British company Application April 19, 1948, Serial No. 21,814
In Great Britain April 21, 1947

13 Claims. (Cl. 68—262)

1

This invention relates to wringing machines, and like machines provided with a pair of co-operating rollers, one at least of which is driven.

The primary objection of the invention is to provide a machine in which the rollers are mounted in such a manner that material of a width greater than the length of the rollers may be treated while ensuring that adequate pressure is maintained between the rollers throughout their length. A further object of the invention is to provide a method of mounting the rollers such that pronounced local irregularities in the thickness of the material to be treated may be accommodated, without loss in the efficiency of the wringing or other operation and without detrimental effects on the machine itself.

According to the present invention in a wringing or like machine having co-operating rollers one at least of which is driven, the first roller is rotatably supported upon a fixed bearing and a second roller is rotatably supported upon a bearing carried by a resilient metal arm or equivalent resilient member which projects within said second roller and is pivotally supported by or on the frame of the machine, means being provided for causing the arm or equivalent resilient member to pivot in the manner of a lever so as to increase or decrease the pressure between said rollers. In particular constructions according to the invention a portion of the frame member of the machine serves as a fulcrum about which the arm or equivalent member is arranged to pivot.

In a preferred construction of machine embodying the invention, the arm consists of a strong leaf spring of substantially rectangular cross-section and one end of the arm is in operative engagement with a pivoted lever supported from the frame-work of the machine, the arrangement being such that when the lever is moved about its pivotal axis by, for example, a screwed spindle, the arm is stressed and applies resultant pressure through the bearings associated with the second roller, thus urging the second roller against the first.

In any of the alternative constructions of machines embodying the invention, the fixed bearing upon which the first roller is supported is housed in a fixed frame member and a rigid member extending from said frame member projects within the first roller and provides a support for a second bearing for that roller. Preferably the second bearing is located within the roller adjacent the bearing supporting the second roller.

2

Figure 2:
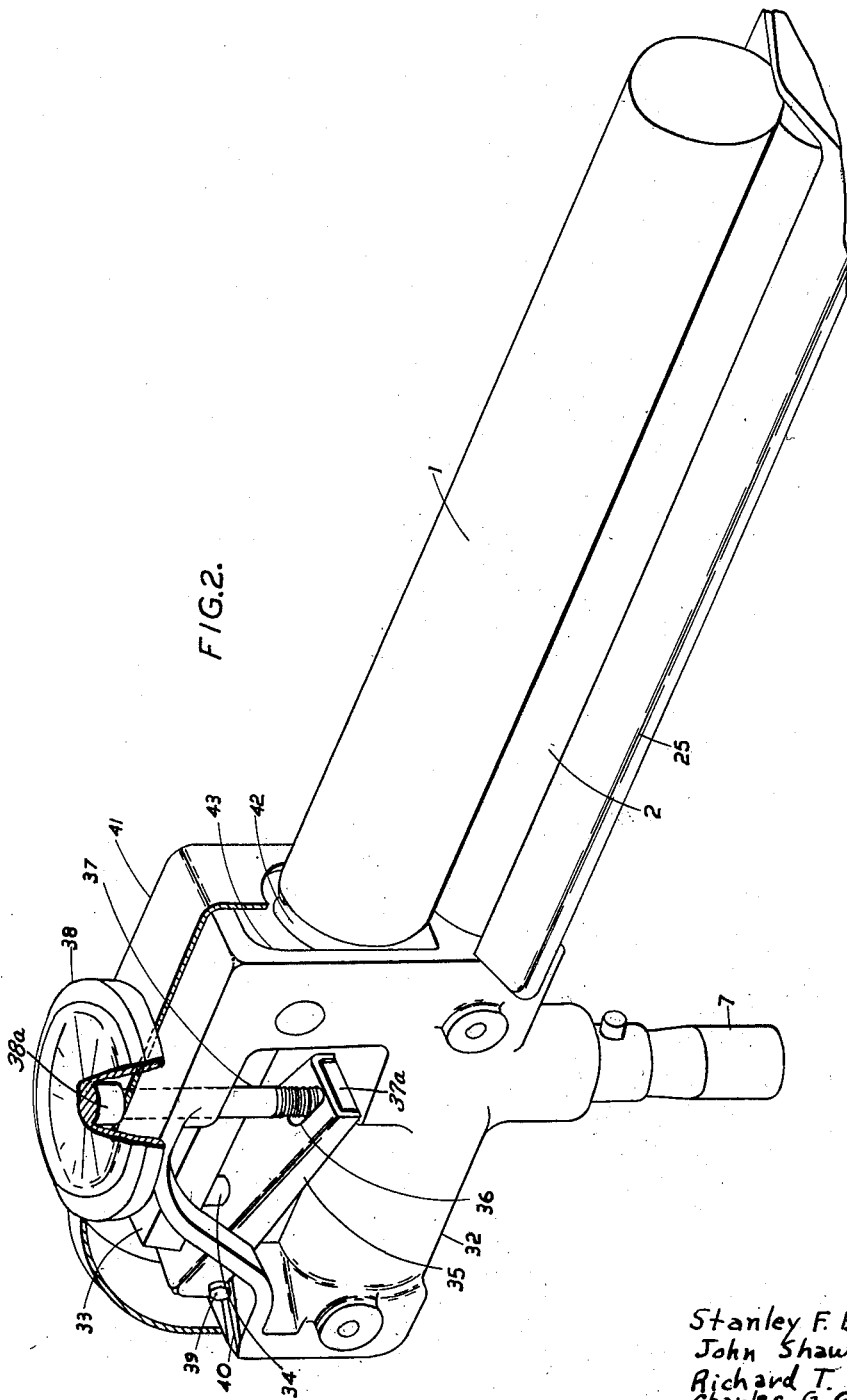

In order that the invention may be more clearly understood and readily carried into effect, alternative constructions of wringing machines embodying the invention will now be more fully described as examples, with reference to the accompanying drawing in which:

Figures 1, 2, and 3 are perspective views of such alternative forms of machine,

Figure 4 is a detailed sectional view of a preferred construction, taken on line 4—4 of Figure 5, Figure 5 is a left-hand end view of the machine shown in Figure 4, Figure 6 is a side elevation of the bar 68, which supports the upper roller, Figure 7 is a plan view of the bar 68, Figure 8 is a transverse cross-section taken along the line 8—8 of Figure 7, Figure 9 is a transverse cross-section taken along the line 9—9 of Figure 7, Figure 10 is a transverse cross-section taken along the line 10—10 of Figure 7, Figure 11 is a vertical cross-section of the rocker 52a taken along the line 11—11 of Figure 12, which is a plan view of the rocker 52a, and Figure 13 illustrates one method of adapting for power drive any of the machines described.

Referring to Figure 1 of the drawings, the rollers 1 and 2 are rotatably supported from an aluminium casing 27 which constitutes the main frame of the machine and which is provided with a spigot 7 to facilitate mounting the machine in any appropriate form of clamp.

The lower roller 2 is fixed to a steel tube not shown which is rotatably mounted in the casing 27 on roller bearings. The steel tube and roller bearings may take the form shown in Figure 4 and described in greater detail in connection with that figure. A driving handle, also not shown, but which again may take the form shown in Fig. 4, is attached to the end of the steel tube. The upper roller 1 is driven frictionally from the lower roller 2 and is rotatably carried in the manner shown in Fig. 4 by roller bearings 16 in a cage 17 which is pivotally attached by a spindle 18 to the end of a strong steel bar 26 (Fig. 1). The outer race for the roller bearings is formed by a cylindrical liner 20 (Fig. 4) which is spot welded to the roller foundation steel tube 21 and is formed with an annulus 22 which projects between radially extending members of a bearing protecting device 23 secured to the end of the bar by a nut 24 on a screwed bolt.

The bar 26 provides the main support for the upper roller 1 and that portion projecting from the roller has a slight downward inclination. The main portion is slightly downwardly inclined as in the construction shown in Figure 4 and extends substantially coaxially within the roller. The bar bears against the boundary edge of an aperture in the frame member through which it passes in a manner similar to that in the construction shown in Fig. 4, the bar thus forming a pivoted lever the fulcrum of which is constituted by the portion of the frame member through which it passes.

The pressure adjusting handle 28 is attached to a spindle 29 which is freely rotatable in the frame 27. The handle mounting includes a boss 27a which extends upwardly to abut the handle 28. The spindle 29 passes with a clearance through an aperture 30 in the bar 26, below which a screw threaded portion of the spindle engages a rectangular nut 31. The upper face of the nut is recessed to receive the end of the bar which thus constrains the nut from rotation.

The handle 28 is made long in order to provide an adequate mechanical advantage and when it is turned in a clockwise direction, the nut 31 traverses up the screw threaded portion of the spindle 29 and raises the end of the bar 26. As the bar is pivoted on the frame member it will tilt to lower the end within the roller and the pressure thus produced will be transmitted through the bearing to the roller which will thus be urged against the lower roller. The pivotal connection between the bar and the bearing cage 17 provided by the spindle 18 serves to allow a slight rocking movement of the upper roller with respect to the lower and thus accommodates irregularities in the thickness on one side or the other of the bearings, of the material being wrung.

The machine is provided with a shelf 25 composed of sheet metal bent to shape and preferably chromium plated, the shelf serving to support the material to be wrung as it is fed between the rollers. This shelf 25 may be fastened at one end to the main frame member 55, as by the screw 25a, and carried at the other end on a stub axle 67a seated in a bearing 67 in the outer end of the lower roller 2.

The construction shown in Figure 2 is similar to that shown in Fig. 1 in that a main frame member 32 is used and a resilient steel bar 33 applies the pressure between the rollers which are mounted and driven in a manner similar to that described with reference to Figure 1. The bar 33 also operates as a lever, the fulcrum again being constituted by the portion of the frame member through which it passes, the arrangement thus being similar to that shown in Figure 4.

The bar 33 is provided with a downwardly projecting short pillar or stub 34 which engages a short lever 35 disposed below and angularly offset with respect to the bar so that one end is displaced from the longitudinal axis of the bar sufficiently to allow passage with a clearance through an aperture 36 of a screw threaded spindle 37 to which a pressure adjusting handle 38 is attached.

Below the lever 35, the spindle 37 screws into a nut, 37a, but which serves a similar purpose to the nut 31 of Figure 1. The opposite end of the lever 35 is provided with a transversely extending pivot or bearing member 39 which rests in a groove 40 in the main frame member. An enclosing casing 41 for the working parts is shown partly cut away to expose the interior. The point at which the stub 34 engages the lever 35 is nearer to the pivoted than to the free end of that lever which thus introduces a mechanical advantage.

When the adjusting handle 38 is rotated clockwise, its hub 38a engages the top of the casing 41 and the free end of the short lever 35 is raised about the axis of the pivot 39, the movement being transmitted to the steel rod through the stub 34 so that the bar is tilted about its fulcrum on the frame member, the end of the bar carrying the roller supporting bearing being depressed and so urging the roller 1 against the lower roller with increasing pressure as turning of the handle 38 is continued.

In order to resist transverse movement of the upper roller during operation of the machine, its foundation tube 21 projects slightly from the roller and carries a band 42 forming a tire with a curved outer surface. During vertical upward or downward movement of the roller the tire rides against the vertical sides 43 of a recess in the frame member, only one of the vertical sides being shown in the drawing.

In the further construction shown in Figure 3, the method of supporting and driving the upper and lower rollers is generally similar to that described in the preceding example, but the frame member is formed in two parts 44, 45 rigidly clamped together by tie hoops 46, 47 provided with nuts of which two 48, 49 are shown.

The resilient steel bar 50 is in this case, however, formed with a downwardly bent end 51 the extremity of which rests on one end of a pivoted lever or rocker 52, shaped and operating substantially in the manner of a bellcrank lever, which is disposed immediately below and in vertical alignment with the steel bar 50. The underside of the lever 52 is curved to provide a pivot or bearing surface which rests in a dished co-operating surface in the fixed frame member 45, the shape of the co-operating surfaces of the lever and frame member being similar to that shown in Figure 4.

A screw threaded pressure adjusting spindle 53 provided with a handle 54 screws into and through the steel bar 50 to engage the free end of the lever 52. Downward drive of the pressure adjusting handle 54 will cause the rocker 52 to pivot about its bearing surface and will raise the end 51 of the steel bar 50 which will thus be stressed and will impart pressure from the upper roller against the lower roller as in the preceding examples described.

A preferred construction of machine is shown in Figures 4 and 5, certain details of which are shown in Figures 6 to 12. Both rollers derive their support from a single main frame member 55 in which a main supporting tube 56 for the lower roller is rigidly fixed by means of rivet 86. An inner bearing race 57 for the lower roller is housed in the frame member 55 and the roller foundation tube 58 which projects slightly into the frame member carries an outer bearing race 59 fixed thereto by means of screws or rivets 85 which fits about 57 to form a cage for the reception of roller bearings 57a.

A driving spindle 60 for the lower roller has a handle 61 attached to it by an easily releasable screw 62. The spindle 60 terminates about midway of the length of the roller and has fixed to it by a pin 63 the outer race 64 for roller bearings 65, the outer race being also fixed to the roller foundation tube 58. The inner race 66 is attached to the main supporting tube 56 so that drive is imparted directly from the spindle to the roller foundation tube. The end of the roller is closed by a dust and dirt excluding cap 67 which also provides a means for attachment of the shelf 25.

The upper roller is rotatably supported by a resilient steel bar 68, the shape and varying cross section of which is shown in Figures 6 to 10. The bar projects within the upper roller 1, passing through an aperture in the frame member upon which the bar bears in the manner of a lever.

The method of rotatably supporting the roller 1 from a pivoted bearing carried at the free end of the bar is as already described with reference to Figure 4.

The pressure adjusting means are similar to those described with reference to Figure 3 and where relevant, the same reference numerals have been applied. The bellcrank lever or rocker 52a is however formed with an extension 69 the upper surface of which is curved. The details of the rocker are shown more clearly in Figures 11 and 12 the former of which is a side elevation in section, the latter being a plan view.

The portion 69 of the rocker engages in inverted V shape recess 70 in the bar 68 to assist positive engagement and in order to prevent undue slackness of the parts on assembly, pre-setting is effected with the aid of a screwed bolt 71 and a locking nut 72. The bolt engages the underside of the bar 68 and when tightened up causes the rocker 52 to seat firmly in the dished recess in the frame member. The recess is provided with a strip steel liner 73 which serves to resist wear more effectively than the light alloy of which the frame member 55 is composed.

In order to guard against possible fracture of the bar 68 due to overload pressure being applied during adjustment or operation, a safety device in the form of a shear pin is provided. This is disposed in the end of the rocker engaged by the pressure adjusting spindle 53 and takes the form of a small pin 74 passed transversely through a plug 75 which has a close but sliding fit in the rocker. The plug is held in position in the rocker by the pin which passes through both the rocker and the plug. The spindle 53 engages the upper surface of the plug and it will be seen that should pressure beyond a pre-selected safety level be applied, the pin 74 will break under the strain. Such a pin is of course more cheaply and readily replaced than the bar 68.

In any of the alternative constructions described it is desirable to provide a guard plate or shield between the ends of the rollers and the frame member or members, in order to prevent material being wrung from fouling any part of the frame member or becoming caught by the tire when such is fitted to the upper roller tube. Such a guard plate is shown at 76 in Figure 4.

Any of the forms of machine described may be adapted for power as distinct from manual drive and one appropriate arrangement is shown in Figure 13 of the drawings. In this figure the end of the driving spindle 77 for the lower roller is shown provided with a crown pinion 78 which replaces the driving handle, the pinion 78 meshing with another crown pinion 79 on the end of a driving shaft 80 driven from a motor or other power unit not shown, but housed within a casing 81 supporting the wringer.

The driving handle may be of any desired form. Cover members 82 and 83 may be attached to the sides of the main frame member 55, as by screw 84.

We claim:

1. A wringing machine comprising in combination a frame, a fixed bearing in the frame, a first roller rotatably supported upon the fixed bearing, a resilient arm, a second roller within which said resilient arm projects, a bearing carried at one end of said resilient arm and providing a rotatable support for said second roller on which said roller may pivot axially, means for pivotally supporting said resilient arm in said frame and means for causing said resilient arm to be pivoted in the manner of a lever so as to vary the pressure between the first and second rollers.

2. A wringing machine according to claim 1 in which said means for pivotally supporting said resilient arm constitutes a portion of said frame serving as a fulcrum about which said resilient arm pivots as the pressure between said rollers is varied.

3. A wringing machine according to claim 1 in which the means for causing said resilient arm to pivot consist of a screw threaded member disposed below said resilient arm at the end thereof remote from said bearing and a screw threaded spindle which passes through said resilient arm into engagement with said screw threaded member, rotation of said spindle causing said screw threaded member to traverse thereon and so to raise or lower the end of said resilient arm.

4. A wringing machine according to claim 1 in which said last mentioned means comprises a screw-threaded spindle and a pivoted lever disposed beneath said resilient arm at the end thereof remote from the bearing carried thereby and in which said end of said resilient arm is in operative engagement with said pivoted lever at a point at one side of the pivotal axis of said lever, said lever being engaged at a point on the other side of its pivotal axis by said screw-threaded spindle, the arrangement being such that when said pivoted lever is moved about its pivotal axis on rotation of said screw-threaded spindle, said resilient arm is stressed to a greater or lesser degree and applies resilient pressure through said bearing carried by said resilient arm to vary the pressure between said rollers.

5. A wringing machine according to claim 1 in which the means for causing said resilient arm to pivot consist of a screw-threaded spindle which passes through said resilient arm and a pivoted lever interposed between the lower end of said screw threaded spindle and the end of said resilient arm remote from the bearing carried thereby, rotation of said spindle causing said lever to alter the vertical position of said resilient arm, said pivoted lever being so dimensioned and disposed that it produces a mechanical advantage in the movement imparted to the resilient arm on rotation of said spindle.

6. A wringing machine comprising in combination a frame, a fixed bearing in the frame, a first roller rotatably supported upon the fixed bearing, a resilient arm, a second roller within which said resilient arm projects, a bearing carried at one end of said resilient arm and providing a rotatable support for said second roller, means for pivotally supporting said resilient arm in said frame, and an actuating member controlling the movement of and disposed below said resilient arm at the end thereof remote from said bearing, said last named end of said resilient arm and said actuating member and said frame constituting a head assembly for said resilient arm, said head assembly being provided with a screw threaded aperture, and a screw threaded spindle rotatable in the aperture in said head assembly and engaging said actuating member, rotation of said spindle causing said actuating member to vertically alter the position of said end of said resilient arm and thereby cause said resilient arm to pivot in the manner of a lever so as to vary the pressure between the first and second rollers.

7. A wringing machine according to claim 6 and comprising a pivoted lever interposed between said screw threaded spindle and the end of said resilient arm remote from the bearing carried thereby, said pivoted lever constituting said actuating member and being so dimensioned and disposed that it produces a mechanical advantage in the movement imparted to the resilient arm on rotation of said spindle.

8. A wringing machine according to claim 6 in which said screw threaded aperture is located in said actuating member, said spindle passes freely through said resilient arm to enter said screw threaded aperture and said actuating member traverses on said spindle as said spindle is rotated.

9. A wringing machine according to claim 6 in which said screw threaded aperture is located in said actuating member, and said actuating member traverses on said spindle as said spindle is rotated.

10. A wringing machine according to claim 9 in which a pivoted lever is interposed between said actuating member and the end of said resilient arm remote from the bearing carried thereby, said pivoted lever being so dimensioned and disposed that it produces a mechanical advantage in the movement imparted to the resilient arm on rotation of said spindle.

11. A wringing machine comprising in combination a frame, a fixed bearing in the frame, a first roller rotatably supported upon the fixed bearing, a resilient arm, a second roller within which said resilient arm projects, a bearing carried at one end of said resilient arm and providing a rotatable support for said second roller on which said roller may pivot axially, means for pivotally supporting said resilient arm in said frame and means for causing said resilient arm to pivot, said last means comprising a screw threaded member disposed beneath said resilient arm at the end thereof remote from said bearing and a screw threaded spindle which passes through said resilient arm into engagement with said screw threaded member, rotation of said spindle causing said screw threaded member to traverse thereon and so to raise or lower the end of said resilient arm in order to vary the pressure between the first and second rollers.

12. A wringing machine comprising in combination a frame, a fixed bearing in the frame, a first roller rotatably supported upon the fixed bearing, a resilient arm, a second roller within which said resilient arm projects, a bearing carried at one end of said resilient arm and providing a rotatable support for said second roller, means for pivotally supporting said resilient arm in said frame and means for causing said resilient arm to pivot, said last means comprising a screw-threaded spindle and a pivoted lever disposed beneath said resilient arm at the end thereof remote from the bearing carried thereby, an insert in said pivoted lever, retaining means in said insert, said retaining means comprising a shear pin, said end of said resilient arm being in operative engagement with said pivoted lever at a point on one side of the pivotal axis of said lever, said insert in said lever being engaged by said screw-threaded spindle at a point on the other side of the pivotal axis of said lever, the arrangement being such that when said pivoted lever is moved about its pivotal axis on rotation of said spindle, said resilient arm is stressed to a greater or lesser degree and applies resilient pressure through said bearing carried by said resilient arm to vary the pressure between said rollers, said shear pin serving to prevent undue stress being applied to said resilient arm by breaking before such stress is reached.

13. A wringing machine comprising in combination a frame, a fixed bearing in the frame, a first roller rotatably supported on the fixed bearing, a resilient arm, a second roller within which said resilient arm projects, a bearing carried at one end of said resilient arm and providing a rotatable support for said second roller, means for pivotally supporting said resilient arm in said frame and means for causing said resilient arm to pivot, said last means comprising a screw-threaded spindle and a pivoted lever disposed beneath said resilient arm at the end thereof remote from the bearing carried thereby and in which said end of said resilient arm has a recess in operative engagement with said pivoted lever at a point at one side of the pivotal axis of said lever, said lever being engaged at a point on the other side of its pivotal axis by said screw-threaded spindle, said frame having a curved bearing recess the arrangement being such that when said pivoted lever is moved about its pivotal axis on rotation of said screw-threaded spindle, said resilient arm is stressed to a greater or lesser degree and applies resilient pressure through said bearing carried by said resilient arm to increase or decrease respectively the pressure between said rollers and in which the end of said pivoted lever engaged by said resilient arm is shaped to seat into said recess in said resilient arm, a portion of said pivoted lever being curved to register with said curved bearing recess in the frame of the machine.

STANLEY FENELEY BICKELL.
JOHN SHAW.
RICHARD TEMPEST RIDDLE.
CHARLES GEORGE GARRARD.

REFERENCES CITED

The following references are of record in the file of this patent:

UNITED STATES PATENTS

| Number | Name | Date |
|---|---|---|
| 35,335 | Van Auken | May 20, 1862 |
| 1,699,993 | Rosensteel | Jan. 22, 1929 |
| 1,709,436 | Koester | Apr. 16, 1929 |
| 2,181,316 | Etten | Nov. 28, 1939 |
| 2,186,787 | Jensen | Jan. 9, 1940 |
| 2,217,376 | Montgomery | Oct. 8, 1940 |
| 2,218,096 | Reinitz | Oct. 15, 1940 |
| 2,228,853 | Skinner | June 14, 1941 |

FOREIGN PATENTS

| Number | Country | Date |
|---|---|---|
| 183,005 | Switzerland | July 1, 1936 |